United States Patent
Wu (10) Patent No.: US 9,063,010 B2
(45) Date of Patent: Jun. 23, 2015

(54) METHOD AND APPARATUS FOR ADJUSTING SENSING THRESHOLD OF INFRARED PROXIMITY SENSOR

(71) Applicant: Huawei Device Co., Ltd., Shenzhen, Guangdong (CN)

(72) Inventor: Zhihui Wu, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/138,647

(22) Filed: Dec. 23, 2013

(65) Prior Publication Data

US 2014/0110583 A1   Apr. 24, 2014

Related U.S. Application Data

(63) Continuation of application No. PCT/CN2011/076273, filed on Jun. 24, 2011.

(51) Int. Cl.
*G01J 5/02* (2006.01)
*G01J 5/10* (2006.01)
*G01S 17/02* (2006.01)
*H04M 1/725* (2006.01)
(Continued)

(52) U.S. Cl.
CPC ............... *G01J 5/10* (2013.01); *G01S 17/026* (2013.01); *H04M 1/72522* (2013.01); *H04M 2250/12* (2013.01); *G01S 7/493* (2013.01); *G01S 2007/4975* (2013.01)

(58) Field of Classification Search
USPC .............................. 250/340, 338.1–338.5, 349
See application file for complete search history.

(56) References Cited

U.S. PATENT DOCUMENTS

| | | | | |
|---|---|---|---|---|
| 4,879,461 | A | * | 11/1989 | Philipp .......................... 250/221 |
| 5,519,483 | A | * | 5/1996 | Kawanishi et al. ............. 399/45 |
| 2005/0205818 | A1 | * | 9/2005 | Bayley et al. ............ 251/129.04 |

(Continued)

FOREIGN PATENT DOCUMENTS

| CN | 1711048 A | 12/2005 |
|---|---|---|
| CN | 101729654 A | 6/2010 |

(Continued)

OTHER PUBLICATIONS

Author: Intersil, Title: Proximity Sensors—Application Note, Date: Mar. 26, 2009, Publisher: Intersil Americas Inc.*

(Continued)

*Primary Examiner* — David J Makiya
*Assistant Examiner* — Taeho Jo
(74) *Attorney, Agent, or Firm* — Leydig, Voit & Mayer, Ltd.

(57) ABSTRACT

A method and an apparatus for adjusting a sensing threshold of an infrared proximity sensor are provided. The method includes: obtaining, through the infrared proximity sensor, a reflected infrared ray intensity value in an environment of a current light intensity; comparing the obtained reflected infrared ray intensity value with a pre-stored reflected infrared ray intensity value, so as to obtain a first difference; and when the first difference is greater than a preset first threshold, modifying the sensing threshold. It avoid misjudge of blocking of the mobile phone because a light transmittance of a lens is reduced, and the fault is solved by modifying the sensing threshold, so that a proximity sensing function of the mobile phone can be automatically repaired without changing hardware.

20 Claims, 4 Drawing Sheets

(51) Int. Cl.
    *G01S 7/493* (2006.01)
    *G01S 7/497* (2006.01)

(56) References Cited

U.S. PATENT DOCUMENTS

| | | | |
|---|---|---|---|
| 2005/0209828 A1* | 9/2005 | Blosser et al. | 702/190 |
| 2008/0165116 A1* | 7/2008 | Herz et al. | 345/102 |
| 2009/0103074 A1* | 4/2009 | Cuomo et al. | 356/51 |
| 2009/0121889 A1* | 5/2009 | Lin et al. | 340/686.6 |
| 2010/0164479 A1* | 7/2010 | Alameh et al. | 324/115 |
| 2010/0167783 A1* | 7/2010 | Alameh et al. | 455/556.1 |
| 2010/0295781 A1* | 11/2010 | Alameh et al. | 345/158 |
| 2010/0299642 A1* | 11/2010 | Merrell et al. | 715/863 |
| 2011/0006188 A1* | 1/2011 | Lin | 250/201.1 |
| 2011/0180686 A1* | 7/2011 | Iwai | 250/205 |

FOREIGN PATENT DOCUMENTS

| | | |
|---|---|---|
| CN | 101800790 A | 8/2010 |
| CN | 101964844 A | 2/2011 |
| GB | 2344650 A | 6/2000 |
| WO | WO 2004049883 A1 | 6/2004 |

OTHER PUBLICATIONS

Chen, "Research machining device microcontroller-based security," China New Technologies and Products, No. 6, pp. 164 (2010).

Most, "Spark detectors using proximity sensors," Design Ideas, pp. 77 (Feb. 2009).

Lang, "Do not abandon your existing network," Technology Features, pp. 22-23, Control Engineering China (Feb. 2009).

Zhang et al., "Coil walking beam transport line debugging and transformation," Engineering Design, vol. 28, No. 4, pp. 68-70 (2009).

Lin, "Research on intelligence Anti-theft alarm system on ground important place," Shanxi Coking Coal Science & Technology, No. 3, pp. 1-3 (Mar. 2009).

Liu et al., "Control System Design of Cleaning Robot," College of Mechatronics and Control Engineering, vol. 12, pp. 127-130, Shenzhen, China (2009).

Zhibin et al., "Obstacle Navigation Control for Power Transmission Line Inspection Robot Based on Multi-sensors," Robot Techniques, Electrical Automation, vol. 31, No. 1, pp. 9-12, Jiangxi University of Science and Technology, Jiangxi, China and Shanghai University, Shanghai, China (2009).

"IFM-Care for the fan operation IFM-Efficient and affordable condition monitoring systems used in the wind power industry," Special Reports, Section 9, pp. 48-49, IFM electronic Co. Ltd., Shanghai, China (Sep. 17, 2009).

Mehta, "IR proximity detector to achieve high-speed operational amplifier," Design Ideas, pp. 62-63 (Nov. 2009).

Tian et al., "Development on Recognition and Control System of the rhythm Code Based on Characteristics of the Psychological Rhythm," Chinese Core Journals, vol. 24, Issues 1-2, pp. 180-182 (2008).

\* cited by examiner

METHOD AND APPARATUS FOR ADJUSTING SENSING THRESHOLD OF INFRARED PROXIMITY SENSOR

CROSS-REFERENCE TO RELATED APPLICATIONS

This application is a continuation of International Patent Application No. PCT/CN2011/076273, filed on Jun. 24, 2011, which is hereby incorporated by reference in its entirety.

FIELD OF THE INVENTION

The present invention relates to the field of electronic technologies, and in particular, to a method and an apparatus for adjusting a sensing threshold of an infrared proximity sensor.

BACKGROUND OF THE INVENTION

At present, more and more people start to use a touch mobile phone, and a large screen and touch operations of the touch mobile phone are very popular among people. However, as the touch mobile phone is operated by touching, when a user calls, the face approaches the touchscreen of the mobile phone, which may cause a false trigger of the mobile phone. Therefore, an IR (infrared) proximity sensor is usually installed in the mobile phone. When the infrared proximity sensor detects that the light is blocked, the mobile phone considers that the face approaches the touchscreen, and therefore turns off the touchscreen, so as to prevent the false trigger caused by the approached face, and power can be saved during a call.

The infrared proximity sensor in the mobile phone can measure a reflected infrared ray intensity. Most of mobile phone manufacturers set a sensing threshold for an infrared proximity sensor, where the sensing threshold is used to determine whether the infrared proximity sensor is blocked, so as to determine whether the light above a touchscreen of a mobile phone is blocked, and finally determine whether the face of a user approaches the touchscreen of the mobile phone. Specifically, the sensing threshold of the infrared proximity sensor may be in a form of a value range (x, y), where x<y, when a reflected infrared ray intensity obtained by the infrared proximity sensor is greater than the upper limit value y of the value range (namely, y is the lower limit value at which the light of the infrared proximity sensor is blocked), it is determined that the light is blocked, and the touchscreen is turned off, and when the reflected infrared ray intensity obtained by the infrared proximity sensor is smaller than the lower limit value x of the value range (namely, x is the upper limit value at which blocking of the light of the infrared proximity sensor is canceled), it is determined that blocking of the light is canceled, and the touchscreen is turned on. In this way, because x<y, a problem that the touchscreen is frequently turned on and off due to fluctuation of an infrared ray intensity. Certainly, in actual use, the sensing threshold may also be in a form of a single threshold Z, when a reflected infrared ray intensity value obtained by the infrared proximity sensor is greater than Z, it is determined that the light is blocked, so the touchscreen is turned off, when the reflected infrared ray intensity value obtained by the infrared proximity sensor is smaller than Z, it is determined that blocking of the light is canceled, so the touchscreen is turned on, and when the reflected infrared ray intensity obtained by the infrared proximity sensor is just equal to Z, it may be set that the touchscreen is turned on or the touchscreen is turned off, which may specifically be preset in a system as required.

However, in the implementation of the present invention, the inventor finds that the prior art at least has the following problem.

Generally, an infrared proximity sensor is placed below a lens, where the lens is an extension part of a touchscreen of a mobile phone, and is generally made of a resin or glass material. The mobile phone has a certain requirement on the light transmittance of the lens. However, after the mobile phone is used for a long time, dust goes into the lens, or the surface of the lens is abraded or blotted, so that the light transmittance is affected, and the infrared proximity sensor is affected in receiving an infrared ray. When the light transmittance is reduced to a certain extent, in a case that the light is not blocked in a call, or actual blocking is canceled in the call, the mobile phone still considers that the mobile phone is blocked according to the sensing threshold and therefore turns off the touchscreen of the mobile phone, thereby affecting use of the mobile phone.

SUMMARY OF THE INVENTION

To solve a problem existing in the prior art, embodiments of the present invention provide a method and an apparatus for adjusting a sensing threshold of an infrared proximity sensor. The technical solutions are as follows.

A method for adjusting a sensing threshold of an infrared proximity sensor includes:

obtaining, through the infrared proximity sensor, a reflected infrared ray intensity value in an environment of a current light intensity;

comparing the obtained reflected infrared ray intensity value with a pre-stored reflected infrared ray intensity value, so as to obtain a first difference between the obtained reflected infrared ray intensity value and the pre-stored reflected infrared ray intensity value; and when the first difference is greater than a preset first threshold, modifying the sensing threshold;

where the sensing threshold is used to determine whether the infrared proximity sensor is blocked; and the reflected infrared ray intensity value is a difference between a first infrared ray intensity value and a second infrared ray intensity value, where when the infrared proximity sensor does not emit an infrared ray and emits an infrared ray, the first infrared ray intensity value and the second infrared ray intensity value are obtained through measurement by the infrared proximity sensor respectively.

Further, the obtaining the reflected infrared ray intensity value in the environment of the current light intensity includes: obtaining one or more reflected infrared ray intensity values in the environment of the current light intensity at the time of no blocking; and the comparing the obtained reflected infrared ray intensity value with the pre-stored reflected infrared ray intensity value, so as to obtain the first difference between the obtained reflected infrared ray intensity value and the pre-stored reflected infrared ray intensity value includes: subtracting the pre-stored reflected infrared ray intensity value in the environment of the current light intensity at the time of no blocking from one reflected infrared ray intensity value in the environment of the current light intensity at the time of no blocking, so as to obtain the first difference; or subtracting the pre-stored reflected infrared ray intensity value in the environment of the current light intensity at the time of no blocking from multiple reflected infrared ray intensity values in the environment of the current light intensity at the time of no blocking, so as to obtain multiple differences, and averaging the multiple differences to obtain the first difference.

Further, the obtaining the reflected infrared ray intensity value in the environment of the current light intensity includes: obtaining one or more reflected infrared ray intensity values in the environment of the current light intensity at the time when a preset position is blocked; and the comparing the obtained reflected infrared ray intensity value with the pre-stored reflected infrared ray intensity value, so as to obtain the first difference between the obtained reflected infrared ray intensity value and the pre-stored reflected infrared ray intensity value includes: subtracting the pre-stored reflected infrared ray intensity value in the environment of the current light intensity at the time when the preset position is blocked from one reflected infrared ray intensity value in the environment of the current light intensity at the time when the preset position is blocked, so as to obtain the first difference; or subtracting the pre-stored reflected infrared ray intensity value in the environment of the current light intensity at the time when the preset position is blocked from multiple reflected infrared ray intensity values in the environment of the current light intensity at the time when the preset position is blocked, so as to obtain multiple differences, and averaging the multiple differences to obtain the first difference.

Further, the modifying the sensing threshold includes:

when the sensing threshold is a value range, adding the first difference to the upper limit value and the lower limit value of the value range, so as to obtain a modified sensing threshold; or when the sensing threshold is a single threshold, adding the first difference to the single threshold, so as to obtain a modified sensing threshold.

Further, after the obtaining the modified sensing threshold, the method further includes:

adding the first difference to the pre-stored reflected infrared ray intensity value to obtain a sum, and using the sum as a new pre-stored reflected infrared ray intensity value.

Further, before the obtaining the reflected infrared ray intensity value in the environment of the current light intensity, the method further includes:

receiving an instruction given by a user, and executing the step of obtaining the reflected infrared ray intensity value in the environment of the current light intensity, where the instruction includes an instruction of starting a call or an instruction of starting to obtain the reflected infrared ray intensity value.

An apparatus for adjusting a sensing threshold of an infrared proximity sensor includes:

an obtaining module, configured to obtain, through the infrared proximity sensor, a reflected infrared ray intensity value in an environment of a current light intensity;

a comparison module, configured to compare the reflected infrared ray intensity value, which is obtained by the obtaining module and in the environment of the current light intensity, with a pre-stored infrared ray intensity value, so as to obtain a first difference between the obtained reflected infrared ray intensity value and the pre-stored reflected infrared ray intensity value; and a modification module, configured to modify the sensing threshold, when the first difference obtained by the comparison module is greater than a preset first threshold;

where the sensing threshold is used to determine whether the infrared proximity sensor is blocked; and the reflected infrared ray intensity value is a difference between a first infrared ray intensity value and a second infrared ray intensity value, where when the infrared proximity sensor does not emit an infrared ray and emits an infrared ray, the first infrared ray intensity value and the second infrared ray intensity value are obtained through measurement by the infrared proximity sensor respectively.

Further, the obtaining module specifically includes: a first obtaining unit, configured to obtain one or more reflected infrared ray intensity values in the environment of the current light intensity at the time of no blocking; and the comparison module specifically includes: a first comparison unit, configured to compare one reflected infrared ray intensity value, which is obtained by the first obtaining unit, in the environment of the current light intensity and at the time of no blocking, with the pre-stored reflected infrared ray intensity value at the time of no blocking, so as to obtain the first difference; or subtract the pre-stored reflected infrared ray intensity value in the environment of the current light intensity at the time of no blocking from multiple reflected infrared ray intensity values which are obtained by the first obtaining unit, in the environment of the current light intensity and at the time of no blocking, so as to obtain multiple differences, and average the multiple differences to obtain the first difference.

Further, the obtaining module specifically includes: a second obtaining unit, configured to obtain one or more reflected infrared ray intensity values in the environment of the current light intensity at the time when a preset position is blocked; and the comparison module specifically includes: a second comparison unit, configured to compare one reflected infrared ray intensity value, which is obtained by the second obtaining unit, in the environment of the current light intensity and at the time when the preset position is blocked, with the pre-stored reflected infrared ray intensity value at the time when the preset position is blocked, so as to obtain the first difference; or subtract the pre-stored reflected infrared ray intensity value in the environment of the current light intensity at the time when the preset position is blocked from multiple reflected infrared ray intensity values which are obtained by the second obtaining unit, in the environment of the current light intensity and at the time when the preset position is blocked, so as to obtain multiple differences, and average the multiple differences to obtain the first difference.

Further, the modification module specifically includes:

a first modification unit, configured to, when the sensing threshold is a value range, add the first difference to the upper limit value and the lower limit value of the sensing threshold, so as to obtain a modified sensing threshold; or a second modification unit, configured to, when the sensing threshold is a single threshold, add the first difference to the single threshold, so as to obtain a modified sensing threshold.

Further, the modification module further includes:

an update unit, configured to, after the first modification unit or the second modification unit obtains the modified sensing threshold, add the first difference to the pre-stored reflected infrared ray intensity value to obtain a sum, and use the sum as a new pre-stored reflected infrared ray intensity value.

Further, the apparatus further includes:

a command receiving module, configured to, before the obtaining module obtains the reflected infrared ray intensity value in the environment of the current light intensity, receive an instruction given by a user, and instruct the obtaining module to execute the obtaining the reflected infrared ray intensity value in the environment of the current light intensity; where the instruction includes an instruction of starting a call or an instruction of starting to obtain the reflected infrared ray intensity value.

Further, the foregoing apparatus is a mobile phone, where the mobile phone further includes: a shell, a circuit board, a processor, a touchscreen, an infrared proximity sensor, a radio frequency circuit, a microphone, a speaker, and a power supply; where the touchscreen is arranged on the shell, the infrared proximity sensor is disposed below the touchscreen, the circuit board is arranged inside space surrounded by the shell, and the processor and the radio frequency circuit are disposed on the circuit board;

the processor includes part or all of the foregoing modules or units, and the processor is configured to process data input through the touchscreen or the infrared proximity sensor, and/or output a processed data result through the touchscreen;

the radio frequency circuit is configured to establish communication between the mobile phone and a wireless network, so as to implement data receiving and sending between the mobile phone and the wireless network;

the microphone is configured to collect sound and convert the collected sound into sound data, so that the mobile phone sends the sound data to the wireless network through the radio frequency circuit;

the speaker is configured to restore sound data, received by the mobile phone through the radio frequency circuit from the wireless network, into sound, and play the sound to the user; and the power supply is configured to supply power to each circuit or component of the mobile phone.

The technical solutions of the present invention bring the following beneficial effects.

In the present invention, a reflected infrared ray intensity value is pre-stored in the mobile phone, a reflected infrared ray intensity value in the environment of the current light intensity is obtained, then the obtained reflected infrared ray intensity value is compared with a pre-stored reflected infrared ray intensity value to determine whether the infrared proximity sensor misjudges blocking of the mobile phone because a light transmittance of a lens is reduced, and the fault is solved by modifying the sensing threshold, so that a proximity sensing function of the mobile phone can be automatically repaired without changing hardware.

BRIEF DESCRIPTION OF THE DRAWINGS

To describe the technical solutions in the embodiments of the present invention more clearly, the following briefly introduces accompanying drawings required for describing the embodiments of the present invention. Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
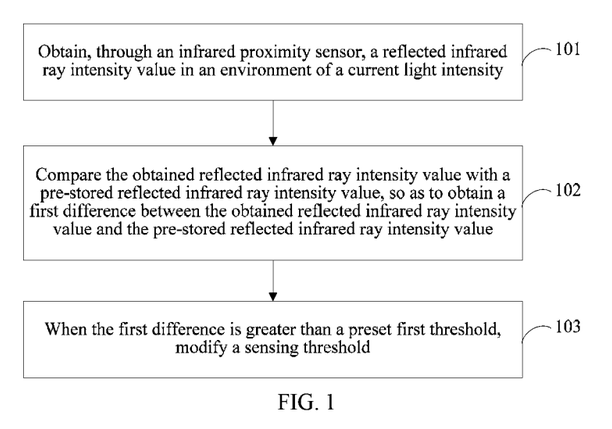
FIG. 1 is a flow chart of a method for adjusting a sensing threshold of an infrared proximity sensor provided in Embodiment 1 of the present invention.

Embodiment 1 of the present invention provides a method for adjusting a sensing threshold of an infrared proximity sensor, and a flow chart of the method is shown in FIG. 1. The method includes:

Step 101: Obtain, through the infrared proximity sensor, a reflected infrared ray intensity value in an environment of a current light intensity.

Step 102: Compare the obtained reflected infrared ray intensity value with a pre-stored reflected infrared ray intensity value, so as to obtain a first difference between the obtained reflected infrared ray intensity value and the pre-stored reflected infrared ray intensity value.

Step 103: When the first difference is greater than a preset first threshold, modify the sensing threshold.

The sensing threshold is used to determine whether the infrared proximity sensor is blocked.

The reflected infrared ray intensity value is a difference between a first infrared ray intensity value and a second infrared ray intensity value, where when the infrared proximity sensor does not emit an infrared ray and emits an infrared ray, the first infrared ray intensity value and the second infrared ray intensity value are obtained through measurement by the infrared proximity sensor respectively.

In the present invention, a reflected infrared ray intensity value is pre-stored in a mobile phone, a reflected infrared ray intensity value in the environment of the current light intensity is obtained, then the obtained reflected infrared ray intensity value is compared with the pre-stored reflected infrared ray intensity value to determine whether the infrared proximity sensor misjudges blocking of the mobile phone because a light transmittance of a lens is reduced, and the fault is solved by modifying the sensing threshold, so that a proximity sensing function of the mobile phone can be automatically repaired without changing hardware.

Embodiment 2

Embodiment 2 of the present invention provides a method for adjusting a sensing threshold of an infrared proximity sensor, which is an improvement based on Embodiment 1.

First, a mobile phone and a sensing threshold of an infrared proximity sensor in the mobile phone that are used in the method in this embodiment are described. In the mobile phone used in this embodiment, the infrared proximity sensor is installed below a touchscreen of the mobile phone. It should be noted that, in environments of different light intensities, different measurement ranges of the infrared proximity sensor may be set, and different sensing thresholds of the infrared proximity sensor may also be set, for example, the mobile phone is usually provided with environments of four levels of light intensities, which are specifically as follows:

an environment of a first-level light intensity, where the measurement range of the infrared proximity sensor for an infrared ray intensity is set in a range between 1 and 1000

LUX, and in this case, the sensing threshold of the infrared proximity sensor is set to (703, 781);

an environment of a second-level light intensity, where the measurement range of the infrared proximity sensor for the infrared ray intensity is set in a range between 1 and 4000 LUX, and the sensing threshold of the infrared proximity sensor is set to (703, 898);

an environment of a third-level light intensity, where the measurement range of the infrared proximity sensor for an infrared ray intensity is set in a range between 1 and 16000 LUX, and the sensing threshold of the infrared proximity sensor is set to (703, 1016); and an environment of a fourth-level light intensity, where the measurement range of the infrared proximity sensor for an infrared ray intensity is set in a range between 1 and 64000 LUX, and the sensing threshold of the infrared proximity sensor is set to (750, 1875).

When the infrared ray intensity is greater than 64000 LUX, it makes no sense for a sensing function of the mobile phone. Therefore, an infrared ray with a light intensity being greater than 64000 LUX is not taken into consideration.

When located in environments of different light intensities, the mobile phone automatically sets the measurement range of the infrared proximity sensor, and matches a corresponding sensing threshold. Reference may be made to the prior art for a specific manner for setting the measurement range of the infrared proximity sensor and a specific manner for matching a corresponding sensing threshold, which are not described here in detail.

It should be noted that, in the foregoing description, the sensing threshold is set to a value range, and in actual application, the sensing threshold may further be set to a single threshold, for example, when the mobile phone is in the environment of the first-level light intensity, the sensing threshold is set to a single threshold 756.

Figure 2:
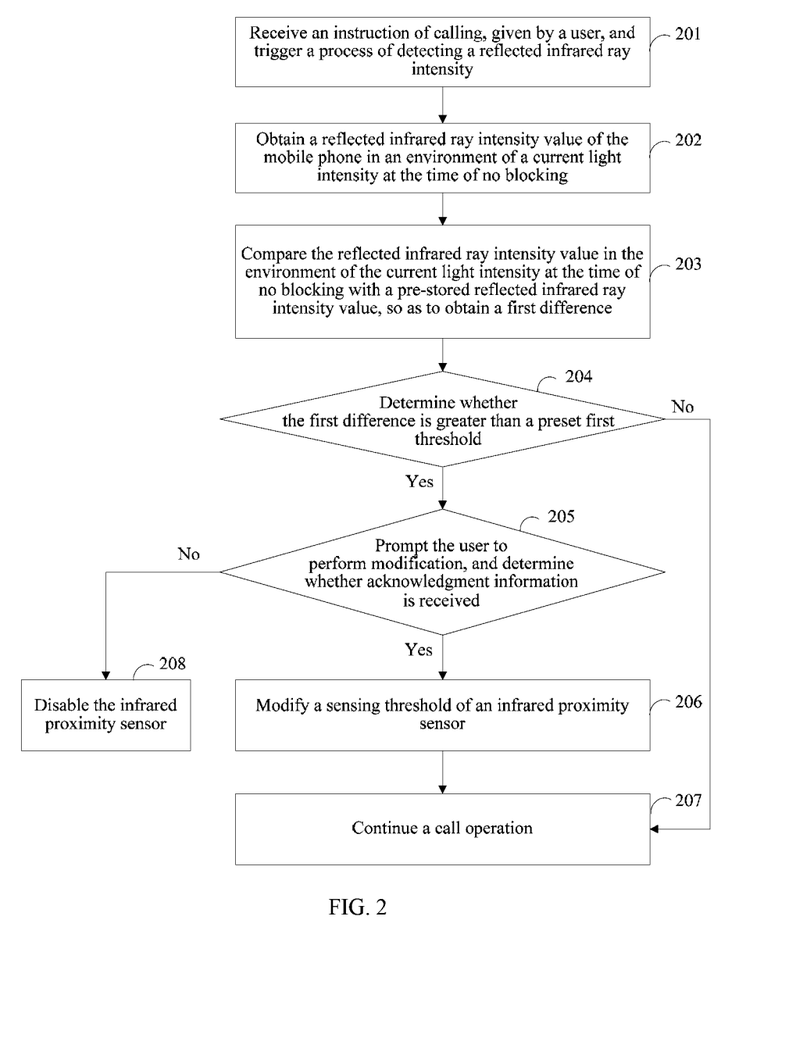
FIG. 2 is a flow chart of a method for adjusting a sensing threshold of an infrared proximity sensor provided in Embodiment 2 of the present invention.

In Embodiment 2, for ease of description, a case where the mobile phone is in the environment of the first-level light intensity is described. As shown in FIG. 2, the method provided in Embodiment 2 includes:

Step 201: Receive an instruction of calling, given by a user, and trigger a process of detecting a reflected infrared ray intensity.

Further, step 201 may further be replaced as follows: receive a command of detecting the reflected infrared ray intensity, where the command is actively given by a user. For example, a function of modifying the sensing threshold is provided in a system of the mobile phone, and a command of detecting the reflected infrared ray intensity is given through the function.

Step 202: Obtain a reflected infrared ray intensity value of the mobile phone in the environment of the current light intensity at the time of no blocking.

In this embodiment, a specific example where the reflected infrared ray intensity value which is obtained by the mobile phone, in the environment of the current light intensity and at the time of no blocking is 420 LUX is taken for description.

It should be noted that, the obtaining the reflected infrared ray intensity value of the mobile phone in the environment of the current light intensity at the time of no blocking specifically includes:

in the environment of the current light intensity at the time of no blocking, obtaining, through measurement, a first infrared ray intensity of an infrared ray received by the infrared proximity sensor when the infrared proximity sensor does not emit an infrared ray;

in the environment of the current light intensity at the time of no blocking, obtaining, through measurement, a second infrared ray intensity of an infrared ray received by the infrared proximity sensor when the infrared proximity sensor emits an infrared ray; and obtaining a difference between the second infrared ray intensity and the first infrared ray intensity, so as to obtain the reflected infrared ray intensity value of the mobile phone in the environment of the current light intensity at the time of no blocking.

Step 203: Compare the foregoing reflected infrared ray intensity value in the environment of the current light intensity at the time of no blocking with a pre-stored reflected infrared ray intensity value, to obtain a first difference.

It should be noted that, step 203 may specifically be: comparing the reflected infrared ray intensity value, which is obtained in step 202 in the environment of the current light intensity at the time of no blocking, with a pre-stored reflected infrared ray intensity value at the time of no blocking, to obtain a first difference. In this embodiment, an example where the pre-stored reflected infrared ray intensity value at the time of no blocking is 300 LUX is taken for description, and the first difference obtained in step 203 is: reflected infrared ray intensity value in the environment of the current light intensity at the time of no blocking, 420, —pre-stored reflected infrared ray intensity value at the time of no blocking, 300, =120 LUX.

Further, step 203 may further specifically be: obtaining, multiple times, reflected infrared ray intensity values in the environment of the current light intensity at the time of no blocking, and compare the obtained intensity values intensity values, which are obtained multiple times in the environment of the current light intensity at the time of no blocking, with the pre-stored reflected infrared ray intensity value at the time of no blocking, so as to obtain multiple differences, and average the multiple differences to obtain the first difference.

Step 204: Determine whether the first difference is greater than a preset first threshold; if yes, execute step 205; otherwise, execute step 207.

The foregoing preset first threshold is set in the mobile phone according to modification accuracy of the sensing threshold of the infrared proximity sensor, for example, in this embodiment, the preset first threshold may be set to 50 LUX, and when the first difference is greater than 50 LUX, the sensing threshold of the infrared proximity sensor is modified; otherwise, modification is not performed.

In this embodiment, the first difference which is obtained by using the manner provided in step 203 is 120 LUX, the first difference is greater than 50 LUX, and therefore the sensing threshold needs to be modified, and step 205 is executed.

Step 205: Prompt the user to perform modification, and determine whether an acknowledgment message of the user is received; if the acknowledgment message of the user is received, execute step 206; otherwise, if the acknowledgment message of the user is not received, execute step 208.

Step 206: Modify the sensing threshold of the infrared proximity sensor.

Specifically, there are two manners for modifying the sensing threshold of the infrared proximity sensor.

Manner 1

When the sensing threshold is a value range, the first difference is added to the upper limit value and the lower limit value of the sensing threshold, so as to obtain a modified sensing threshold. Specifically, according to the foregoing assumption, if a current sensing threshold is (703, 781), 120 LUX is added to the upper limit value 703 LUX of the sensing threshold to obtain 823 LUX, and 120 LUX is added to the lower limit value 781 LUX of the sensing threshold to obtain 901 LUX. Therefore, it is obtained that the modified sensing threshold is (823, 901).

When the sensing threshold is a single threshold, the first difference is added to the single threshold, so as to obtain a modified sensing threshold. Specifically, according to the foregoing assumption, if the current sensing threshold is 756 LUX, 120 LUX is added to the current sensing threshold 756 LUX to obtain the modified sensing threshold 876 LUX.

It should be noted that, after the sensing threshold is modified by using Manner 1, Manner 1 may further include: modifying the pre-stored reflected infrared ray intensity value in the mobile phone in a state of no blocking, by adding the first difference to the pre-stored reflected infrared ray intensity value in the mobile phone in the state of no blocking, and storing the modified pre-stored reflected infrared ray intensity value as a new pre-stored reflected infrared ray intensity value in the state of no blocking. In this embodiment, specifically, 120 LUX is added to the pre-stored reflected infrared ray intensity value 300 LUX in the mobile phone in the state of no blocking, so as to obtain a new pre-stored reflected infrared ray intensity value 420 LUX in the mobile phone in the state of no blocking.

Manner 2

Step 1: Prompt the user to place the mobile phone in a place where light is not blocked.

Step 2: Obtain again a reflected infrared ray intensity value in the environment of the current light intensity at the time of no blocking.

In Manner 2, an example is taken for description, where after the user obtains the prompt of the mobile phone, the user places the mobile phone in the place when the light is not blocked, and obtains that a reflected infrared ray intensity value in the environment of the current light intensity at the time of no blocking is 460 LUX.

Step 3: Compare the reflected infrared ray intensity value in the state where the light is not blocked currently with the pre-stored reflected infrared ray intensity value in a state of no blocking, so as to obtain a second difference.

In Manner 2, the reflected infrared ray intensity value in the state where the light is not blocked currently, 460 LUX, is compared with the pre-stored reflected infrared ray intensity value in the state of no blocking, 300 LUX, so as to obtain a second difference 160 LUX.

Step 4: Average the second difference and the first difference, so as to obtain a third difference.

In Manner 2, the first difference 120 LUX obtained in step 203 at the time of no blocking and the second difference 160 LUX obtained by obtaining again the reflected infrared ray intensity value at the time of no blocking are averaged to obtain 140 LUX, so the third difference is 140 LUX.

Step 5: Add the third difference to the upper limit value and the lower limit value of the sensing threshold, so as to obtain the modified sensing threshold.

In Manner 2, the third difference 140 LUX is added to the upper limit value 703 LUX and the lower limit value 781 LUX of the sensing threshold, so as to obtain the modified sensing threshold (743, 921).

It should be noted that, when the sensing threshold is a single threshold 756 LUX, the third difference 140 LUX is added to the sensing threshold, so as to obtain the modified sensing threshold 896 LUX.

It should be noted that, after the sensing threshold is modified by using Manner 2, Manner 2 may further include: modifying the pre-stored reflected infrared ray intensity value, in the mobile phone at the time of no blocking, by adding the third difference to the pre-stored reflected infrared ray intensity value in the mobile phone at the time of no blocking, and storing the modified pre-stored reflected infrared ray intensity value to obtain a new pre-stored reflected infrared ray intensity value at the time of no blocking. For example, 140 LUX is added to the pre-stored reflected infrared ray intensity value in the mobile phone at the time of no blocking, 300 LUX, so as to obtain a new pre-stored reflected infrared ray intensity value in the mobile phone at the time of no blocking, 440 LUX.

Further, in Manner 2, only a case where the mobile phone obtains again the reflected infrared ray intensity value at the time of no blocking so as to modify the sensing threshold is described, and in actual application, the reflected infrared ray intensity values at the time of no blocking may further be obtained multiple times, differences between the reflected infrared ray intensity values and the pre-stored reflected infrared ray intensity value at the time of no blocking are calculated, and averaged to modify the sensing threshold, so as to get a better effect, which is not described here in detail.

Step 207: Continue a call operation.

It should be noted that, when step 201 is that the user actively gives a command of detecting the reflected infrared ray intensity, and the mobile phone obtains the command of detecting the reflected infrared ray intensity, step 207 may be replaced with: prompting the user that the infrared proximity sensor works normally, and the sensing threshold does not need to be modified.

Step 208: Disable the infrared proximity sensor.

In the present invention, a reflected infrared ray intensity value is pre-stored in the mobile phone, a reflected infrared ray intensity value in the environment of the current light intensity is obtained, then the obtained reflected infrared ray intensity value is compared with the pre-stored reflected infrared ray intensity value to determine whether the infrared proximity sensor misjudges blocking of the mobile phone because a light transmittance of a lens is reduced, and the fault is solved by modifying the sensing threshold, so that a proximity sensing function of the mobile phone can be automatically repaired without changing hardware.

Embodiment 3

Figure 3:
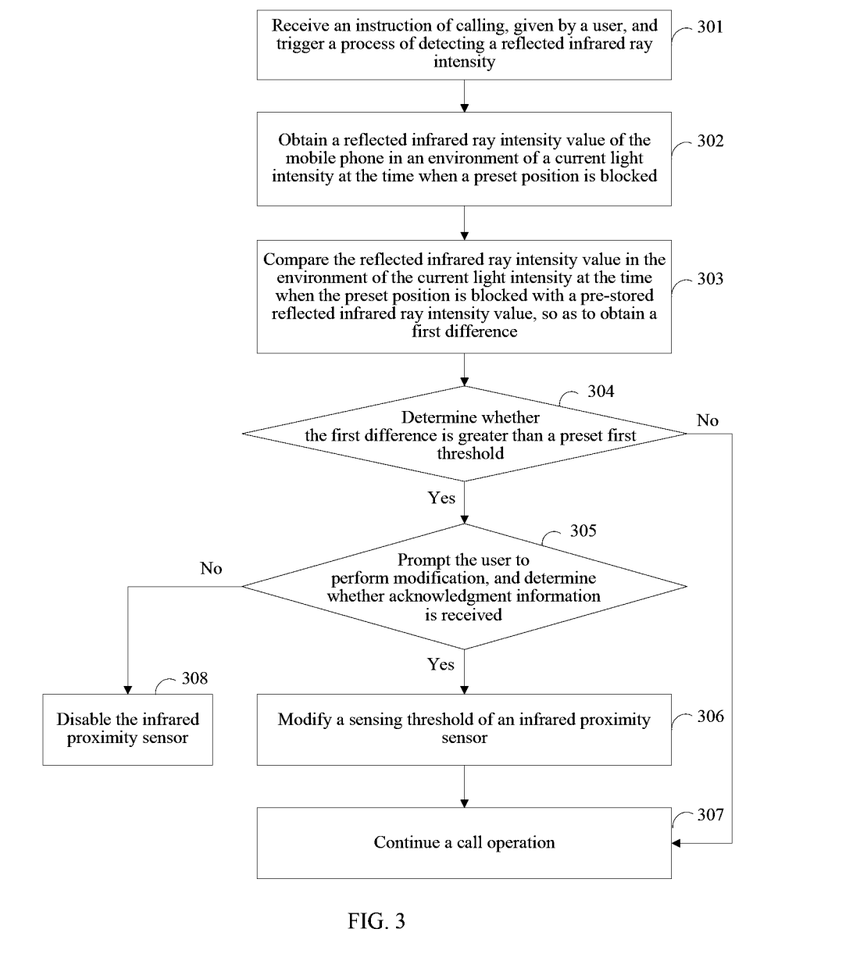
FIG. 3 is a flow chart of a method for adjusting a sensing threshold of an infrared proximity sensor provided in Embodiment 3 of the present invention.

This embodiment provides a method for adjusting a sensing threshold of an infrared proximity sensor. As shown in FIG. 3, this embodiment is an improvement based on Embodiment 1. In Embodiment 3, for ease of description, a case where a mobile phone is in an environment of a first-level light intensity is described. In Embodiment 3, the method for adjusting a sensing threshold of an infrared proximity sensor includes:

Step 301: Receive an instruction of calling, given by a user, and trigger a process of detecting a reflected infrared ray intensity.

Further, step 301 may be replaced with the following:

Receive a command of detecting the reflected infrared ray intensity, where the command is actively given by a user.

For example, a function of modifying the sensing threshold is provided in a system of the mobile phone, and the command of detecting the reflected infrared ray intensity is given through the function.

Step 302: Obtain a reflected infrared ray intensity value of the mobile phone in an environment of a current light intensity at the time when a preset position is blocked.

In this embodiment, a specific example where the reflected infrared ray intensity value which is obtained by the mobile phone in the environment of the current light intensity at the time when the preset position is blocked is 810 LUX is taken for description.

It should be noted that, the obtaining the reflected infrared ray intensity value of the mobile phone in the environment of the current light intensity at the time when the preset position is blocked specifically includes:

in the environment of the current light intensity and at the time when the preset position is blocked, obtaining, through measurement, a first infrared ray intensity of an infrared ray received by the infrared proximity sensor when the infrared proximity sensor does not emit an infrared ray;

in the environment of the current light intensity and at the time when the preset position is blocked, obtaining, through measurement, a second infrared ray intensity of an infrared ray received by the infrared proximity sensor when the infrared proximity sensor emits an infrared ray; and obtaining a difference between the second infrared ray intensity and the first infrared ray intensity, so as to obtain the reflected infrared ray intensity value of the mobile phone in the environment of the current light intensity at the time when the preset position is blocked.

Step 303: Compare the foregoing reflected infrared ray intensity value in the environment of the current light intensity at the time when the preset position is blocked with a pre-stored reflected infrared ray intensity value, to obtain a first difference.

It should be noted that, this step is specifically as follows:

Compare the reflected infrared ray intensity value, which is obtained in step 302 in the environment of the current light intensity at the time when the preset position is blocked, with the pre-stored reflected infrared ray intensity value at the time when the preset position is blocked, to obtain the first difference. In this embodiment, an example where the pre-stored reflected infrared ray intensity value at the time when the preset position is blocked is 700 LUX is taken for description, and the first difference obtained in this step is: reflected infrared ray intensity value in the environment of the current light intensity at the time when the preset position is blocked, 810, —pre-stored reflected infrared ray intensity value at the time when the preset position is blocked, 700, =110 LUX.

Further, step 303 may further specifically be: obtaining, multiple times, reflected infrared ray intensity values in the environment of the current light intensity at the time when the preset position is blocked, and compare the obtained reflected infrared ray intensity values in the environment of the current light intensity at the time when the preset position is blocked with the pre-stored reflected infrared ray intensity value at the time when the preset position is blocked, so as to obtain multiple differences, and average the multiple differences to obtain the first difference.

Step 304: Determine whether the first difference is greater than a preset first threshold; if yes, execute step 305; otherwise, execute step 307.

The foregoing preset first threshold is set in the mobile phone according to modification accuracy of the sensing threshold of the infrared proximity sensor, for example, in this embodiment, the preset first threshold may be set to 50 LUX, and when the first difference is greater than 50 LUX, the sensing threshold of the infrared proximity sensor is modified; otherwise, modification is not performed.

In this embodiment, the first difference which is obtained by using the manner provided in step 303 is greater than 50 LUX, and therefore the sensing threshold needs to be modified, and step 305 is executed.

Step 305: Prompt the user to perform modification, and determine whether an acknowledgment message of the user is received; if yes, execute step 306; otherwise, execute step 308.

Step 306: Modify the sensing threshold of the infrared proximity sensor.

Specifically, there are two manners for modifying the sensing threshold of the infrared proximity sensor.

Manner 1

When the sensing threshold is a value range, the first difference is added to the upper limit value and the lower limit value of the sensing threshold, so as to obtain a modified sensing threshold. Specifically, according to the foregoing assumption, if a current sensing threshold is (703, 781), 110 LUX is added to the upper limit value 703 LUX of the sensing threshold to obtain 813 LUX, and 110 LUX is added to the lower limit value 781 LUX of the sensing threshold to obtain 891 LUX. Therefore, it is obtained that the modified sensing threshold is (813, 891).

When the sensing threshold is a single threshold, the first difference is added to the single threshold, so as to obtain a modified sensing threshold. Specifically, according to the foregoing assumption, if the current sensing threshold is 756 LUX, 110 LUX is added to the current sensing threshold 756 LUX to obtain the modified sensing threshold 866 LUX.

It should be noted that, after the sensing threshold is modified by using Manner 1, Manner 1 may further include: modifying the pre-stored reflected infrared ray intensity value in the mobile phone at the time when the preset position is blocked, by adding the first difference to the pre-stored reflected infrared ray intensity value in the mobile phone at the time when the preset position is blocked, and storing the modified pre-stored reflected infrared ray intensity value as a new pre-stored reflected infrared ray intensity value at the time when the preset position is blocked. In this embodiment, specifically, 110 LUX is added to the pre-stored reflected infrared ray intensity value in the mobile phone at the time when the preset position is blocked, 700 LUX, so as to obtain a new pre-stored reflected infrared ray intensity value in the mobile phone at the time when the preset position is blocked, 810 LUX.

Manner 2

Step 1: Prompt the user to block light above the preset position of a touchscreen of the mobile phone.

In Manner 2, the preset position of blocking light is set to a position which is 3 to 4 centimeters above the touchscreen.

Step 2: Obtain again a reflected infrared ray intensity value in the environment of the current light intensity at the time when the preset position is blocked.

In Manner 2, an example is taken for description, where the reflected infrared ray intensity value which is obtained when the preset position above the touchscreen of the mobile phone is blocked is 800 LUX.

Step 3: Compare the reflected infrared ray intensity value, which is obtained in step 2 in the environment of the current light intensity at the time when the preset position is blocked, with a pre-stored reflected infrared ray intensity value in the mobile phone at the time when the preset position is blocked, so as to obtain a second difference.

In Manner 2, the reflected infrared ray intensity value at the time when the preset position of the touchscreen of the mobile phone is blocked, 800 LUX, is compared with the pre-stored reflected infrared ray intensity value in the mobile phone when the preset position of the touchscreen of the mobile phone is blocked, 700 LUX, so as to obtain a second difference, 100 LUX.

Step 4: Average the second difference and the first difference, so as to obtain a third difference.

In Manner 2, the first difference 110 LUX, obtained in step 303 at the time when the preset position is blocked, and the second difference 100 LUX, obtained by obtaining again the reflected infrared ray intensity value at the time when the preset position is blocked, are averaged to obtain 105 LUX, so the third difference is 105 LUX.

Step 5: Add the third difference to the upper limit value and the lower limit value of the sensing threshold, so as to obtain the modified sensing threshold.

In this embodiment, the third difference 105 LUX is added to the upper limit value 703 LUX and the lower limit value 781 LUX of the sensing threshold, so as to obtain the modified sensing threshold (808, 886).

It should be noted that, when the sensing threshold is a single threshold 756 LUX, the third difference 105 LUX is added to the sensing threshold, so as to obtain the modified sensing threshold, 861 LUX.

It should be noted that, after the sensing threshold is modified by using Manner 2, the method further includes: modifying the pre-stored reflected infrared ray intensity value at the time when the preset position of the touchscreen of the mobile phone is blocked and the pre-stored reflected infrared ray intensity value at the time of no blocking which are in the mobile phone, adding the third difference to the pre-stored reflected infrared ray intensity value in the mobile phone at the time when the preset position is blocked, and storing the modified pre-stored reflected infrared ray intensity value as a new pre-stored reflected infrared ray intensity value at the time when the preset position is blocked. For example, the third difference 105 LUX is added to the pre-stored reflected infrared ray intensity value in the mobile phone at the time when the preset position is blocked, 700 LUX, so as to obtain a new pre-stored reflected infrared ray intensity value in the mobile phone at the time when the preset position is blocked, 805 LUX.

Further, in Manner 2, only a case where the mobile phone obtains again the reflected infrared ray intensity value at the time when the preset position is blocked, so as to modify the sensing threshold is described, and in actual application, reflected infrared ray intensity values at the time when the preset position is blocked may further be obtained multiple times, differences between the reflected infrared ray intensity values at the time when the preset position is blocked and the pre-stored reflected infrared ray intensity value at the time when the pre-stored position is blocked are calculated, and averaged to modify the sensing threshold, so as to get a better effect, which is not described here in detail.

Step 307: Continue a Call Operation.

It should be noted that, when step 301 is that the user actively gives a command of detecting the reflected infrared ray intensity, and the mobile phone obtains the command of detecting the reflected infrared ray intensity, step 307 may be replaced with: prompting the user that the infrared proximity sensor works normally, and the sensing threshold does not need to be modified.

Step 308: Disable the Infrared Proximity Sensor.

In the present invention, a reflected infrared ray intensity value is pre-stored in the mobile phone, a reflected infrared ray intensity value in the environment of the current light intensity is obtained, then the obtained reflected infrared ray intensity value is compared with the pre-stored reflected infrared ray intensity value to determine whether the infrared proximity sensor misjudges blocking of the mobile phone because a light transmittance of a lens is reduced, and the fault is solved by modifying the sensing threshold, so that a proximity sensing function of the mobile phone can be automatically repaired without changing hardware.

Embodiment 4

Figure 4:
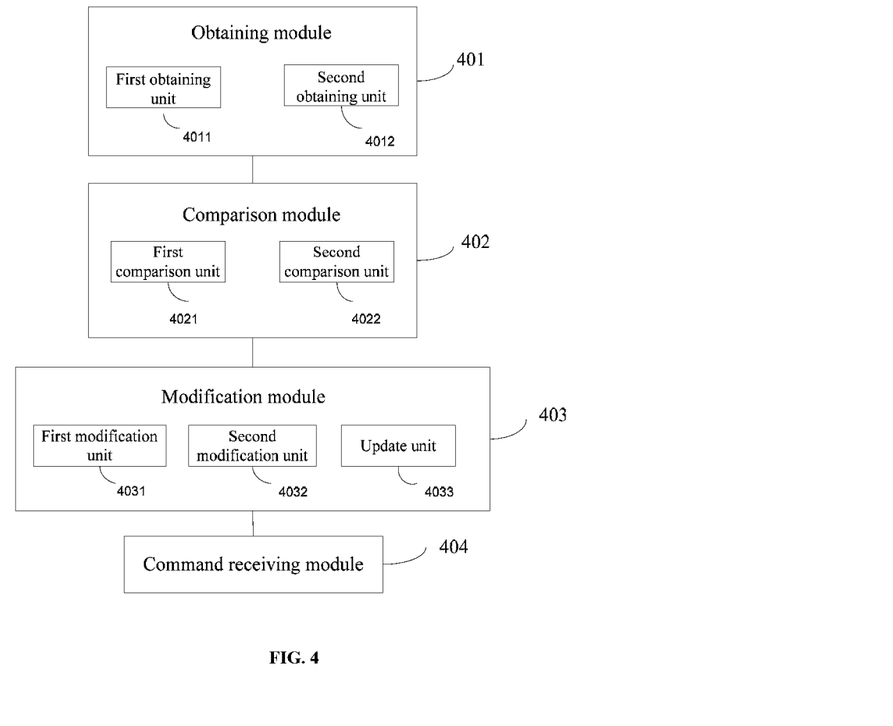
FIG. 4 is a schematic structural diagram of an apparatus for adjusting a sensing threshold of an infrared proximity sensor provided in Embodiment 4 of the present invention.

This embodiment provides an apparatus for adjusting a sensing threshold of an infrared proximity sensor. As shown in FIG. 4 The apparatus includes:

an obtaining module 401, configured to obtain, through the infrared proximity sensor, a reflected infrared ray intensity value in an environment of a current light intensity;

a comparison module 402, configured to compare the reflected infrared ray intensity value, which is obtained by the obtaining module 401 and in the environment of the current light intensity, with a pre-stored reflected infrared ray intensity value, so as to obtain a first difference between the obtained reflected infrared ray intensity value and the pre-stored reflected infrared ray intensity value; and a modification module 403, configured to modify the sensing threshold, when the first difference obtained by the comparison module 402 is greater than a preset first threshold;

where the sensing threshold is used to determine whether the infrared proximity sensor is blocked, and the reflected infrared ray intensity value is a difference between a first infrared ray intensity value and a second infrared ray intensity value, where when the infrared proximity sensor does not emit an infrared ray and emits an infrared ray, the first infrared ray intensity value and the second infrared ray intensity value are obtained through measurement by the infrared proximity sensor respectively.

Further, the obtaining module 401 specifically includes:

a first obtaining unit 4011, configured to obtain one or more reflected infrared ray intensity values in the environment of the current light intensity at the time of no blocking; and correspondingly, the comparison module 402 specifically includes:

a first comparison unit 4021, configured to compare one reflected infrared ray intensity value, which is obtained by the first obtaining unit 4011, in the environment of the current light intensity and at the time of no blocking, with the pre-stored reflected infrared ray intensity value at the time of no blocking, so as to obtain the first difference; or subtract the pre-stored reflected infrared ray intensity value in the environment of the current light intensity at the time of no blocking from multiple reflected infrared ray intensity values which are obtained by the first obtaining unit 4011, in the environment of the current light intensity and at the time of no blocking, so as to obtain multiple differences, and average the multiple differences to obtain the first difference.

Further, the obtaining module 401 specifically includes:

a second obtaining unit 4012, configured to obtain one or more reflected infrared ray intensity values in the environment of the current light intensity at the time when a preset position is blocked; and correspondingly, the comparison module 402 specifically includes:

a second comparison unit 4022, configured to compare one reflected infrared ray intensity value, which is obtained by the second obtaining unit 4012, in the environment of the current light intensity and at the time when the preset position is blocked, with the pre-stored reflected infrared ray intensity value at the time when the preset position is blocked, so as to obtain the first difference; or subtract the pre-stored reflected infrared ray intensity value in the environment of the current light intensity at the time when the preset position is blocked from multiple reflected infrared ray intensity values which are obtained by the second obtaining unit 4012, in the environment of the current light intensity and at the time when the preset position is blocked, so as to obtain multiple differences, and average the multiple differences to obtain the first difference.

Further, the modification module 403 specifically includes:

a first modification unit 4031, configured to, when the sensing threshold is a value range, add the first difference to the upper limit value and the lower limit value of the sensing threshold, so as to obtain a modified sensing threshold; or a second modification unit 4032, configured to, when the sensing threshold is a single threshold, add the first difference to the single threshold, so as to obtain a modified sensing threshold.

Further, the modification module 403 further includes:

an update unit 4033, configured to, after the first modification unit 4031 or the second modification unit 4032 obtains the modified sensing threshold, add the first difference to the pre-stored reflected infrared ray intensity value to obtain a sum, and use the sum as a new pre-stored reflected infrared ray intensity value.

Further, the apparatus further includes:

a command receiving module 404, configured to, before the obtaining module 401 obtains the reflected infrared ray intensity value in the environment of the current light intensity, receive an instruction given by a user, and instruct the obtaining module 401 to execute the obtaining the reflected infrared ray intensity value in the environment of the current light intensity; where the instruction includes an instruction of starting a call or an instruction of starting to obtain the reflected infrared ray intensity value.

It should be noted that, the apparatus for adjusting the sensing threshold of the infrared proximity sensor shown in FIG. 4 may be a mobile phone, an eBook, a personal digital assistant (PDA, personal digital assistant), a palmtop computer, a man-machine terminal, or another handheld terminal device having a display function. In this embodiment of the present invention, when the apparatus is a mobile phone, the mobile phone may further include: a shell, a circuit board, a processor, a touchscreen, an infrared proximity sensor, a radio frequency circuit, a microphone, a speaker, and a power supply; where the touchscreen is arranged on the shell, the infrared proximity sensor is disposed below the touchscreen, the circuit board is arranged inside space surrounded by the shell, and the processor and the radio frequency circuit are disposed on the circuit board;

the processor includes part or all of the foregoing modules or units, and the processor is configured to process data input through the touchscreen or the infrared proximity sensor, and/or output a processed data result through the touchscreen;

the radio frequency circuit is configured to establish communication between the mobile phone and a wireless network, to implement data receiving and sending between the mobile phone and the wireless network;

the microphone is configured to collect sound and convert the collected sound into sound data, so that the mobile phone sends the sound data to the wireless network through the radio frequency circuit;

the speaker is configured to restore sound data, received by the mobile phone through the radio frequency circuit from the wireless network, into sound, and play the sound to the user; and the power supply is configured to supply power to each circuit or component of the mobile phone.

In the present invention, a reflected infrared ray intensity value is pre-stored in the mobile phone, a reflected infrared ray intensity value in the environment of the current light intensity is obtained, then the obtained reflected infrared ray intensity value is compared with the pre-stored reflected infrared ray intensity value to determine whether the infrared proximity sensor misjudges blocking of the mobile phone because a light transmittance of a lens is reduced, and the fault is solved by modifying the sensing threshold, so that a proximity sensing function of the mobile phone can be automatically repaired without changing hardware.

It should be noted that, the apparatus for adjusting a sensing threshold of an infrared proximity sensor provided in the foregoing embodiment is just exemplified through division of function modules, and in actual application, different function modules may implement the foregoing functions as required, namely, the internal structure of the apparatus may be divided into different function modules, so as to implement all or part of functions described in the foregoing. In addition, the apparatus for adjusting a sensing threshold of an infrared proximity sensor provided in the foregoing embodiment and the embodiments of the method for adjusting a sensing threshold of an infrared proximity sensor belong to the same conception, and the specific implementation process is described in detail in the method embodiments, which is not described here again.

The sequence numbers of the above embodiments of the present invention are merely for the convenience of description, and do not imply the preference among the embodiments.

Persons of ordinary skill in the art may understand that all or a part of the steps of the foregoing method embodiments may be implemented by a program instructing relevant hardware. The program may be stored in a computer readable storage medium. When the program is run, the steps of the foregoing method embodiments are performed. The storage medium may be any medium that is capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solution described in the foregoing embodiments or make equivalent replacements to some technical features thereof; and such modifications or replacements do not make essence of corresponding technical solutions depart from the spirit and scope of the technical solution of the embodiments of the present invention.

What is claimed is:

1. A method for adjusting a sensing threshold for an infrared proximity sensor, the method comprising:

obtaining, by the infrared proximity sensor, a first reflected infrared ray intensity value, the first reflected infrared ray intensity value corresponding to a current environment;

obtaining a difference value, wherein the difference value is based on comparing the first reflected infrared ray intensity value with a stored reflected infrared ray intensity value; and modifying, in response to determining that the difference value is greater than a first difference threshold, the sensing threshold for the infrared proximity sensor;

wherein the sensing threshold is used to determine whether the infrared proximity sensor is blocked; and wherein the first reflected infrared ray intensity value is a difference between a first infrared ray intensity value and a second infrared ray intensity value, the first infrared ray intensity value corresponding to a measurement obtained by the infrared proximity sensor without the infrared proximity sensor emitting an infrared ray, and the second infrared ray intensity value corresponding to a measurement obtained by the infrared proximity sensor based on the infrared proximity sensor emitting an infrared ray.

2. The method according to claim 1, wherein obtaining the first reflected infrared ray intensity value is performed in a current environment where the infrared proximity sensor is not blocked; and wherein the difference value is further based on subtracting the stored reflected infrared ray intensity value from the first reflected infrared ray intensity value.

3. The method according to claim 1, wherein obtaining the first reflected infrared ray intensity value is performed in a current environment where the infrared proximity sensor is blocked; and wherein the difference value is further based on subtracting the stored reflected infrared ray intensity value from the first reflected infrared ray intensity value.

4. The method according to claim 1, wherein the sensing threshold comprises a range of values, and modifying the sensing threshold comprises:

adding the difference value to the upper limit and the lower limit of the range so as to obtain a modified sensing threshold.

5. The method according to claim 4, wherein after the modified sensing threshold is obtained, the method further comprises:

adding the difference value to the stored reflected infrared ray intensity value to obtain a sum, and using the sum as a new stored reflected infrared ray intensity value.

6. The method according to claim 1, wherein before obtaining the first reflected infrared ray intensity value, the method further comprises:

receiving an instruction from a user, wherein the instruction comprises an instruction to start a call or an instruction to obtain a reflected infrared ray intensity value.

7. The method according to claim 1, further comprising:

obtaining multiple reflected infrared ray intensity values in a current environment where the infrared proximity sensor is not blocked, including the obtaining of the first reflected infrared ray intensity value; and wherein the difference value is further based on subtracting the stored reflected infrared ray intensity value from the multiple obtained reflected infrared ray intensity values so as to obtain multiple differences; and averaging the multiple differences to obtain the difference value.

8. The method according to claim 1, further comprising:

obtaining multiple reflected infrared ray intensity values in a current environment where the infrared proximity sensor is blocked, including the obtaining of the first reflected infrared ray intensity value; and wherein the difference value is further based on subtracting the stored reflected infrared ray intensity value from the multiple obtained reflected infrared ray intensity values so as to obtain multiple differences; and averaging the multiple differences to obtain the difference value.

9. The method according to claim 1, wherein the sensing threshold is a single value, and modifying the sensing threshold comprises:

adding the difference value to the single value so as to obtain a modified sensing threshold.

10. The method according to claim 9, wherein after the modified sensing threshold is obtained, the method further comprises:

adding the difference value to the stored reflected infrared ray intensity value to obtain a sum and using the sum as a new stored reflected infrared ray intensity value.

11. An apparatus comprising an infrared proximity sensor, a processor, and a processor-readable medium having processor-executable instructions stored thereon for adjusting a sensing threshold for the infrared proximity sensor, wherein the processor executable instructions comprise instructions for:

obtaining a first reflected infrared ray intensity value, the first reflected infrared ray intensity value corresponding to a current environment;

obtaining a difference value, wherein the difference value is based on comparing the first reflected infrared ray intensity value with a stored reflected infrared ray intensity value; and modifying, in response to determining that the difference value is greater than a first difference threshold, the sensing threshold for the infrared proximity sensor;

wherein the sensing threshold is used to determine whether the infrared proximity sensor is blocked; and wherein the first reflected infrared ray intensity value is a difference between a first infrared ray intensity value and a second infrared ray intensity value, the first infrared ray intensity value corresponding to a measurement obtained by the infrared proximity sensor without the infrared proximity sensor emitting an infrared ray, and the second infrared ray intensity value corresponding to a measurement obtained by the infrared proximity sensor based on the infrared proximity sensor emitting an infrared ray.

12. The apparatus according to claim 11, wherein the apparatus is configured to perform the obtaining the first reflected infrared ray intensity value performed in a current environment where the infrared proximity sensor is not blocked; and wherein the difference value is further based on subtracting the stored reflected infrared ray intensity value from the first reflected infrared ray intensity value.

13. The apparatus according to claim 11, wherein the apparatus is configured to perform the obtaining the first reflected infrared ray intensity value is performed in a current environment where the infrared proximity sensor is blocked; and wherein the difference value is further based on subtracting the stored reflected infrared ray intensity value from the first reflected infrared ray intensity value.

14. The apparatus according to claim 11, wherein the sensing threshold comprises a range of values, and modifying the sensing threshold comprises:

adding the difference value to the upper limit and the lower limit of the range so as to obtain a modified sensing threshold.

15. The apparatus according to claim 14, wherein the processor-executable instructions further comprise instructions for:

after the modified sensing threshold is obtained, adding the difference value to the stored reflected infrared ray intensity value to obtain a sum, and using the sum as a new stored reflected infrared ray intensity value.

16. The apparatus according to claim 11, wherein the processor-executable instructions further comprise instructions for:

before obtaining the first reflected infrared ray intensity value, receiving an instruction from a user, wherein the instruction comprises an instruction to start a call or an instruction to obtain a reflected infrared ray intensity value.

17. The apparatus according to claim 11, wherein the processor-executable instructions further comprise instructions for:
  obtaining multiple reflected infrared ray intensity values in a current environment where the infrared proximity sensor is not blocked, including the obtaining of the first reflected infrared ray intensity value; and
  wherein the difference value is further based on subtracting the stored reflected infrared ray intensity value from the multiple obtained reflected infrared ray intensity values so as to obtain multiple differences; and averaging the multiple differences to obtain the difference value.

18. The apparatus according to claim 11, wherein the processor-executable instructions further comprise instructions for:
  obtaining multiple reflected infrared ray intensity values in a current environment where the infrared proximity sensor is blocked, including the obtaining of the first reflected infrared ray intensity value; and
  wherein the difference value is further based on subtracting the stored reflected infrared ray intensity value from the multiple obtained reflected infrared ray intensity values so as to obtain multiple differences; and averaging the multiple differences to obtain the difference value.

19. The apparatus according to claim 11, wherein the sensing threshold is a single value, and modifying the sensing threshold comprises:
  adding the difference value to the single value so as to obtain a modified sensing threshold.

20. The apparatus according to claim 11, wherein the processor-executable instructions further comprise instructions for:
  after the modified sensing threshold is obtained, adding the difference value to the stored reflected infrared ray intensity value to obtain a sum and using the sum as a new stored reflected infrared ray intensity value.

\* \* \* \* \*